(12) United States Patent
Kishimoto et al.

(10) Patent No.: US 10,903,504 B2
(45) Date of Patent: Jan. 26, 2021

(54) CARBON CATALYST FOR REDOX FLOW BATTERY ELECTRODES

(71) Applicant: NISSHINBO HOLDINGS INC., Tokyo (JP)

(72) Inventors: Takeaki Kishimoto, Chiba (JP); Mayumi Mizushiri, Chiba (JP)

(73) Assignee: NISSHINBO HOLDINGS INC., Tokyo (JP)

( * ) Notice: Subject to any disclaimer, the term of this patent is extended or adjusted under 35 U.S.C. 154(b) by 152 days.

(21) Appl. No.: 16/074,249

(22) PCT Filed: Feb. 3, 2017

(86) PCT No.: PCT/JP2017/003992
§ 371 (c)(1),
(2) Date: Jul. 31, 2018

(87) PCT Pub. No.: WO2017/145709
PCT Pub. Date: Aug. 31, 2017

(65) Prior Publication Data
US 2019/0341625 A1    Nov. 7, 2019

(30) Foreign Application Priority Data
Feb. 26, 2016   (JP) .................. 2016-036338

(51) Int. Cl.
*H01M 4/92* (2006.01)
*H01M 4/96* (2006.01)
(Continued)

(52) U.S. Cl.
CPC ............. *H01M 4/926* (2013.01); *H01M 4/96* (2013.01); *H01M 8/188* (2013.01); *B01J 21/18* (2013.01)

(58) Field of Classification Search
CPC ...... B01J 21/18; B01J 35/0033; B01J 35/023; B01J 35/1023; B01J 35/1028; H01M 4/926; H01M 4/96; H01M 8/188
(Continued)

(56) References Cited

U.S. PATENT DOCUMENTS 5,759,711 A   6/1998  Miyabayashi et al.
6,509,119 B1  1/2003  Kobayashi et al.
(Continued)

FOREIGN PATENT DOCUMENTS

CN   105304913 A   2/2015
EP   1 524 711 A2   4/2005
(Continued)

OTHER PUBLICATIONS

Lantao Wu et al., "Boosting vanadium flow battery performance by Nitrogen-doped carbon nanospheres electrocatalyst." Nano Energy 28, pp. 19-28. (Year: 2016).*

(Continued)

*Primary Examiner* — Patricia L. Hailey
(74) *Attorney, Agent, or Firm* — Birch, Stewart, Kolasch & Birch, LLP

(57) ABSTRACT

An electrode for redox flow batteries is produced using a carbon catalyst for redox flow battery electrodes, the carbon catalyst being a particulate carbon catalyst and consisting of carbonaceous particles having a specific surface area of 800 to 2000 m²/g and an average particle size of 100 to 1000 nm.

6 Claims, 1 Drawing Sheet

(51) Int. Cl.
*H01M 8/18* (2006.01)
*B01J 21/18* (2006.01)

(58) Field of Classification Search
USPC ............... 502/100, 101, 180, 182–185, 200;
423/445 R; 429/209, 220, 221, 223, 224,
429/229, 231.5, 231.8, 527; 977/773
See application file for complete search history.

(56) References Cited

U.S. PATENT DOCUMENTS

| | | | |
|---|---|---|---|
| 7,470,418 B2* | 12/2008 | Yoon .................... | B82Y 30/00 |
| | | | 423/445 R |
| 7,749,935 B2* | 7/2010 | Ota ........................ | B01J 21/185 |
| | | | 423/447.1 |
| 7,919,427 B2 | 4/2011 | Ota et al. | |
| 10,096,841 B2* | 10/2018 | Lee ......................... | H01M 4/92 |
| 2004/0247872 A1* | 12/2004 | Sudo ................. | C04B 35/62802 |
| | | | 428/402.24 |
| 2005/0075240 A1 | 4/2005 | Yamamoto | |
| 2005/0085379 A1 | 4/2005 | Ishihara et al. | |
| 2006/0247122 A1 | 11/2006 | Hampden-Smith et al. | |
| 2008/0176129 A1 | 7/2008 | Lee et al. | |
| 2012/0046434 A1 | 2/2012 | Lee et al. | |
| 2013/0224598 A1* | 8/2013 | Kameda ............... | H01M 4/587 |
| | | | 429/231.8 |
| 2015/0311504 A1* | 10/2015 | Hong .................. | H01M 4/0404 |
| | | | 429/217 |
| 2016/0185600 A1* | 6/2016 | Sotowa ................... | C01B 32/20 |
| | | | 252/182.1 |
| 2016/0293963 A1* | 10/2016 | Wessling ............... | H01M 8/188 |
| 2017/0133690 A1* | 5/2017 | Ha ........................ | C01B 32/18 |
| 2017/0346101 A1 | 11/2017 | Lee et al. | |
| 2018/0323445 A1* | 11/2018 | Sun ........................ | H01M 4/96 |

FOREIGN PATENT DOCUMENTS

| | | |
|---|---|---|
| GB | 2498803 A | 7/2013 |
| JP | H05-234612 A | 9/1993 |
| JP | H09-223513 A | 8/1997 |
| JP | 11-260390 A | 9/1999 |
| JP | 2002-184446 A | 6/2002 |
| JP | 2005-118671 A | 5/2005 |
| JP | 2006-156029 A | 6/2006 |
| JP | 2009-277360 A | 11/2009 |
| JP | 2010-108908 A | 5/2010 |
| JP | 2013-137957 A | 7/2013 |
| JP | 2017-027918 A | 2/2017 |
| KR | 10-2008-0069897 A | 7/2008 |
| KR | 10-2015-0096140 A | 8/2015 |

OTHER PUBLICATIONS

Julia Melke et al., "Carbon materials for the positive electrode in all-vanadium redox flow batteries." Carbon 78, pp. 220-230. (Year: 2014).*
M. H. Chakrabarti et al., "Application of carbon materials in redox flow batteries." Journal of Power Sources 253, pp. 150-166. (Year: 2014).*
Antolini, "Carbon Supports for Low-temperature Fuel Cell Catalysts", Applied Catalysis B: Environmental, vol. 88, No. 1-2, Apr. 29, 2009, pp. 1-24.
Extended European Search Report dated Sep. 2, 2019, for European Patent Application No. 17756150.3.
Extended European Search Report dated Sep. 2, 2019, for European Patent Application No. 17756151.1.
Park et al., "Nanostructured Electrocatalysts for All-Vanadium Redox Flow Batteries", Chemistry—An Asian Journal, vol. 10, No. 10., Oct. 1, 2015, pp. 2096-2110.
Ryu et al., "Catalytic Effects of B/N-co-Doped Porous Carbon Incorporated with Ketjenblack Nanoparticles for All-Vanadium Redox Flow Batteries", Journal of The Electrochemical Society, vol. 163, No. 1, Nov. 10, 2015, pp. A5144-A5149.
Japanese Information Offer Form for Japanese Application No. 2016-036336, dated May 28, 2019.
Lee et al., "Development of nitrogen-doped carbons using the hydrothermal method as electrode materials for vanadium redox flow batteries," J Appl Electrochem, vol. 43, 2013 (Published online Mar. 26, 2013), pp. 553-557.
Park et al., "Corn protein-derived nitrogen-doped carbon materials with oxygen-rich functional groups: a highly efficient electrocatalyst for all-vanadium redox flow batteries," Energy & Environmental Science, Online Article, Aug. 22, 2014, 9 pages.
International Search Report for PCT/JP2017/003991 (PCT/ISA/210) dated Mar. 7, 2017.
International Search Report issued in PCT/JP2017/003992 (PCT/ISA/210), dated Mar. 7, 2017.
U.S. Appl. No. 16/074,318, filed Jul. 31, 2018.
Chinese Office Action and Search Report dated Sep. 7, 2020 for Application No. 201780011411.2.
Chinese Office Action and Search Report dated Sep. 8, 2020 for Application No. 201780011412.7.
Liu et at., "Porous carbon derived iron disposable shadclock peel as ars excellent catalyst toward VO2+/VO2+ couple for vanadium redox battery" Journal of Power Sources, vol. 209, 2015 (Available online. Sep. 12, 2015). pp. 301-308.

* cited by examiner

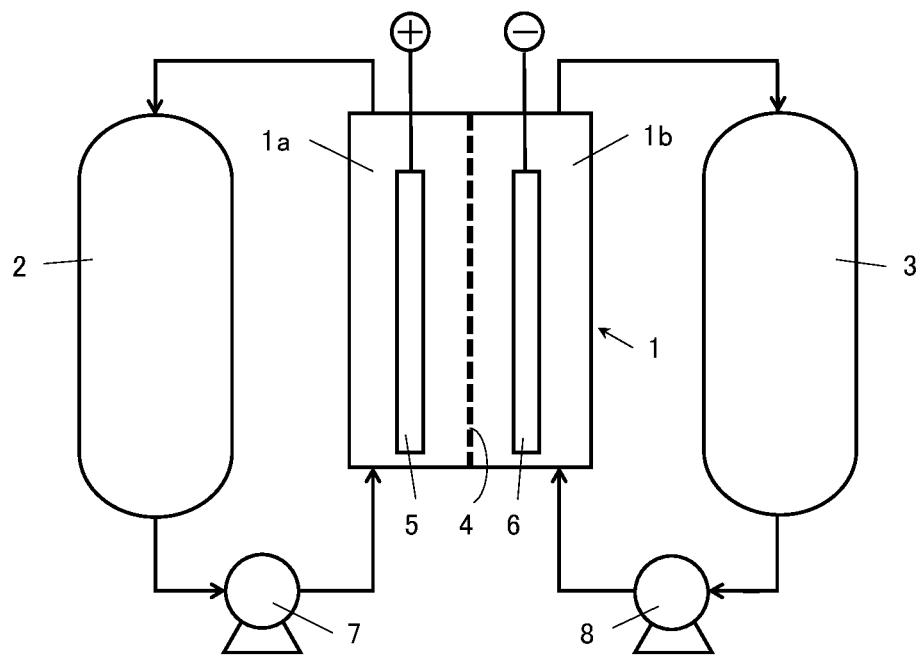

CARBON CATALYST FOR REDOX FLOW BATTERY ELECTRODES

TECHNICAL FIELD

The present invention relates to a catalyst for use in electrodes of redox flow batteries and particularly relates to a carbon catalyst for redox flow battery electrodes that consists of a carbonaceous material and that is suitable for use in vanadium redox flow batteries.

BACKGROUND ART

In recent years, a shift toward renewable energy generation such as wind power generation and photovoltaic power generation has been promoted to establish a low carbon society. However, wind power generation and photovoltaic power generation have a problem in that the power output varies depending on the time of day, the season, and the weather. To meet a large-scale electricity demand, it is necessary to take a measure for leveling load of electricity demand against the power output variation.

Power storage using storage batteries have been attracting interest as one of the measures for electric load leveling. Among storage batteries, redox flow batteries are particularly promising as batteries for large-scale power storage due to their features such as being easy to increase in size, being highly safe and stable, and having a long charge-discharge cycle life.

Redox flow batteries are flow batteries that are charged and discharged through ion oxidation-reduction reactions induced by pump circulation of electrolyte solutions. FIG. 1 shows the outline of the configuration of a typical redox flow battery. The redox flow battery shown in FIG. 1 includes a cell 1, a catholyte tank 2, and an anolyte tank 3. The cell 1 is divided into a cathode cell 1a and an anode cell 1b by an ion-permeable separation membrane 4. A cathode 5 is provided in the cathode cell 1a, while an anode 6 is provided in the anode cell 1b. The cathode cell 1a is connected to the catholyte tank 2 that supplies and receives a catholyte, and the catholyte is circulated by a catholyte pump 7. The anode cell 1b is connected to the anolyte tank 3 that supplies and receives an anolyte, and the anolyte is circulated by an anolyte pump 8. In the redox flow battery, cations contained in the electrolyte solutions (the catholyte and anolyte) move between the cathode cell 1a and anode cell 1b through the separation membrane 4 and undergo oxidation-reduction reaction both at the cathode 5 and at the anode 6, which leads to a change in valence of the ions contained in the electrolyte solutions. In this way, charge and discharge are repeated.

Redox flow batteries as described above have the disadvantage of having a lower energy density than other storage batteries. Thus, research and development aimed at improvement in energy density have been conducted, and various modifications or proposals related to electrodes have been made in terms of facilitating electrode reactions in redox flow batteries.

For example, Patent Literature 1 describes a carbon electrode material for vanadium redox flow batteries, the electrode material comprising vapor-grown carbon fibers having an average fiber diameter of 0.05 to 0.3 μm and an average aspect ratio of 10 to 500.

Additionally, electrode production using oxidized graphene, partially-reduced graphite oxide, nitrogen-doped carbon, a metal-supported carbon material or the like has also been reported.

Other than improvements to electrodes themselves, the use of a phthalocyanine, platinum catalyst, or the like as an electrode catalyst has also been reported. Patent Literature 2 states that an electrode catalyst obtained by modifying the surface of a carbon electrode with a metal-containing carbon thin film through thermal decomposition of metal phthalocyanine has high catalytic activity for an electrode reaction of a redox flow battery.

CITATION LIST

Patent Literature

PTL 1: JP 2006-156029 A
PTL 2: JP 2015-115158 A

SUMMARY OF INVENTION

Technical Problem

However, the electrode described in Patent Literature 1 is unsatisfactory in terms of the reversibility of oxidation-reduction reaction.

Other conventional electrodes are difficult to produce for practical use. As for metal-supported carbon materials etc., it cannot be said that the specific metal species and the specific method for supporting have been thoroughly investigated.

Additionally, conventional electrode catalysts have insufficient catalytic activity and durability or are expensive, and are therefore not practically useful. Even the electrode catalyst described in Patent Literature 2 cannot be said to have satisfactory catalytic activity. In an example of Patent Literature 2, a carbon thin film-coated glassy carbon (GC) plate electrode consisting of a GC plate coated with a metal-containing carbon thin film is produced, and this catalyst is thought to be not practically useful on carbon felt or carbon fiber non-woven fabric which is suitable for use as an electrode for redox flow batteries.

Therefore, an electrode that provides improvement in energy density, in particular, an electrode that facilitates electrode reactions and that has excellent durability, is demanded from the viewpoint of full-fledged practical use and widespread utilization of redox flow batteries.

The present invention has been made to solve the above problems, and an object of the present invention is to provide a carbon catalyst for redox flow battery electrodes that is able to facilitate electrode reactions in redox flow batteries and that has excellent durability.

Solution to Problem

The present invention has been made with a focus on electrode catalysts to improve the energy density of redox flow batteries and is based on the finding that a carbon catalyst having specific forms is able to facilitate electrode reactions and provide high durability.

That is, the present invention provides the following [1] to [7].

[1] A carbon catalyst for redox flow battery electrodes, being a particulate carbon catalyst and consisting of carbonaceous particles having a specific surface area of 800 to 2000 m$^2$/g and an average particle size of 100 to 1000 nm.

[2] The carbon catalyst according to [1] above, wherein the carbonaceous particles have an aspect ratio of 1 to 10.

[3] The carbon catalyst according to [1] or [2] above, wherein the carbonaceous particles comprise carbon, nitrogen, and oxygen.

[4] The carbon catalyst according to any one of [1] to [3] above, wherein the carbonaceous particles comprise 0.001 to 1.0 mass % of a metal component.

[5] An electrode for redox flow batteries, comprising the carbon catalyst according to any one of [1] to [4] above.

[6] A redox flow battery comprising the electrode according to [5] above.

[7] The redox flow battery according to [6] above, being a vanadium redox flow battery.

Advantageous Effects of Invention

The carbon catalyst for redox flow battery electrodes according to the present invention is able to facilitate electrode reactions in redox flow batteries and has excellent durability.

The use of the carbon catalyst for redox flow battery electrodes according to the present invention can therefore provide an electrode for redox flow batteries that exhibits good charge-discharge cycle characteristics and can also increase the energy density of redox flow batteries. The carbon catalyst for redox flow battery electrodes according to the present invention is, in particular, suitably applicable to vanadium redox flow batteries.

BRIEF DESCRIPTION OF DRAWING

FIG. 1 schematically shows the outline of the configuration of an exemplary redox flow battery.

DESCRIPTION OF EMBODIMENTS

Hereinafter, the present invention will be described in detail.

[Carbon Catalyst]

The carbon catalyst for redox flow battery electrodes according to the present invention is a particulate carbon catalyst. The carbon catalyst is characterized by consisting of carbonaceous particles having a specific surface area of 800 to 2000 m$^2$/g and an average particle size of 100 to 1000 nm.

The carbon catalyst having such surface characteristics is able to facilitate electrode reactions in redox flow batteries, improve the charge-discharge characteristics, and provide satisfactory durability.

The specific surface area herein refers to a value determined by a BET method based on nitrogen gas absorption. The average particle size refers to a median diameter (D50) measured by a laser diffraction-scattering method. Specifically, the specific surface area and average particle size can be measured by the methods described in Examples below.

The carbon catalyst according to the present invention is applicable both to redox flow batteries employing aqueous electrolyte solutions and to those employing non-aqueous electrolyte solutions. In view of the fact that the carbon catalyst has hydrophilicity, the catalyst is preferably applied to redox flow batteries employing aqueous electrolyte solutions.

Electrolyte solutions of redox flow batteries contain metal ions whose valence is variable, and examples include iron-chromium electrolyte solutions, iron-titanium electrolyte solutions, titanium-manganese electrolyte solutions, manganese-chromium electrolyte solutions, chromium electrolyte solutions, and vanadium electrolyte solutions. Among these, vanadium electrolyte solutions ($VO^{2+}/VO_2^+(V^{4+}/V^{5+})$, $V^{2+}/V^{3+}$) are preferred to obtain a high electromotive force. These electrolyte solutions are preferably acidic aqueous solutions such as aqueous solutions of sulfuric acid, hydrochloric acid, nitric acid, or phosphoric acid and more preferably aqueous sulfuric acid solutions, in order to be solutions in which the metal ions or oxometal ions as active materials are stably present.

Thus, the electrolyte solutions in the present invention are preferably vanadium electrolyte solutions; that is, it is preferable that the catholyte be an aqueous sulfuric acid solution containing $VO^{2+}/VO_2^+(V^{4+}/V^{5+})$ and the anolyte be an aqueous sulfuric acid solution containing $V^{2+}/V^{3+}$.

The specific surface area of the carbonaceous particles is 800 to 2000 m$^2$/g, preferably 1000 to 1800 m$^2$/g, and more preferably 1100 to 1600 m$^2$/g. When the specific surface area is within this range, the improvement in catalytic activity and durability of the carbon catalyst can be achieved.

If the specific surface area is less than 800 m$^2$/g, it is difficult to improve the catalytic activity. If the specific surface area is more than 2000 m$^2$/g, the catalyst is bulky, which makes it difficult to fix the catalyst to the electrode material uniformly in order to produce an electrode having good performance. Additionally, a carbon catalyst having sufficient durability cannot be obtained.

In general, carbonaceous particles obtained through carbonizing heat treatment of a non-graphitizable carbon material have a specific surface area below the above range.

The average particle size of the carbonaceous particles constituting the carbon catalyst of the present invention is 100 to 1000 nm and preferably 180 to 900 nm. When the average particle size is within this range, the carbon catalyst and an electrode employing this catalyst can easily be produced.

If the average particle size is less than 100 nm, the particles are so small that the production and handling of the carbon catalyst is difficult and are prone to aggregation. Additionally, the carbon catalyst fixed on the surface of the electrode material will be so dense that the catalyst may undesirably hinder penetration of the electrolyte solution into the electrode. If the average particle size is more than 1000 nm, the particles are so large that it is difficult to fix the catalyst to the electrode material uniformly in order to produce an electrode having good performance.

The aspect ratio of the carbonaceous particles is preferably 1 to 10, more preferably 1 to 8, and even more preferably 1 to 4. From the viewpoint of the improvement in catalytic activity and durability, particles having an aspect ratio within the above range are more preferred than, for example, long fibers with a high aspect ratio.

The aspect ratio as described herein refers to the ratio of a long side to a short side of the smallest rectangle among circumscribed rectangles of the particle shape in image analysis using a transmission or scanning electron microscope. Specifically, the aspect ratio can be measured by the method described in Examples below.

The carbonaceous particles preferably comprise carbon, nitrogen, and oxygen. When the carbonaceous particles comprise nitrogen and oxygen as constituents in addition to carbon, the catalytic activity and durability of the carbon catalyst tend to be further improved.

The constituents of the carbonaceous particles can be identified by surface analysis using X-ray photoelectron spectroscopy (XPS).

The nitrogen content in the carbonaceous particles, as expressed by the ratio of the number of nitrogen atoms to the number of carbon atoms (N/C ratio) which is measured by XPS surface analysis, is preferably 0.005 to 0.30 and more preferably 0.010 to 0.10.

The oxygen content in the carbonaceous particles, as expressed by the ratio of the number of oxygen atoms to the number of carbon atoms (O/C ratio) which is measured by XPS surface analysis, is preferably 0.030 to 0.20, more preferably 0.050 to 0.20, and even more preferably 0.060 to 0.18.

Specifically, the N/C ratio and O/C ratio can be determined by the methods described in Examples below.

From the viewpoint of the improvement in catalytic activity and durability, the carbonaceous particles preferably comprise 0.001 to 1.0 mass % of a metal component, and the content of the metal component is more preferably 0.002 to 0.800 mass %.

The quantification of the metal component in the carbonaceous particles can be performed by inductively coupled plasma (ICP) emission spectrometry. Specifically, the quantification can be performed by the method described in Examples below.

The metal component may be one derived from a raw material used for synthesis of the carbonaceous particles and preferably comprises a transition metal. Among transition metals, scandium, titanium, vanadium, chromium, manganese, iron, cobalt, nickel, zinc, or copper is preferred, iron, cobalt, or copper is more preferred, and iron or cobalt is even more preferred. These metals may be contained alone, or two or more thereof may be contained.

[Method for Producing Carbon Catalyst (Carbonaceous Particles)]

The method for producing the carbonaceous particles used as the carbon catalyst of the present invention is not particularly limited. Carbon black such as Ketjenblack which is obtained by thermal decomposition or incomplete combustion of a hydrocarbon raw material such as an oil or natural gas may be used. Carbonaceous particles obtained by carbonizing a raw material by any other method can also be used. In particular, it is preferable to use carbonaceous particles obtained by carbonizing a raw material containing a nitrogen atom-containing organic substance and a metal.

An example of the method of carbonization is a method consisting successively of mixing of a transition metal powder into a solution of a nitrogen atom-containing resin, drying, infusibilizing treatment, baking, acid washing, and re-baking. Specifically, the carbonaceous particles can be produced by the method as described in Examples below.

The organic substance in the raw material subjected to carbonization is not particularly limited as long as it is a nitrogen-atom containing organic substance that can be carbonized, and any one or more of such substances can be used. For example, at least one selected from organic polymer compounds such as thermosetting resins and thermoplastic resins and low molecular weight organic compounds can be used. Biomass can also be used.

Specific examples of the organic substance include: cyclic organic compounds such as pyrrole, imidazole, pyridine, piperidine, triazole, and tetrazole; derivatives of these cyclic organic compounds; and polymer compounds such as polyacrylonitrile (PAN), acrylonitrile-methacrylic acid copolymer (PAN-PMA), polyimide, urea resin, polyaniline, and polypyrrole. Among these, acrylonitrile-methacrylic acid copolymer (PAN-PMA) and polyacrylonitrile (PAN) are preferably used.

The metal contained in the raw material subjected to carbonization is preferably a transition metal from the viewpoint of effective improvement in catalytic activity of the carbon catalyst. Among transition metals, scandium, titanium, vanadium, chromium, manganese, iron, cobalt, nickel, zinc, or copper is preferred, and iron, cobalt, or copper is more preferred. These may be contained alone, or two or more thereof may be contained.

The metal may be added by itself or in the form of a metal compound. Examples of the metal compound include a metal salt, a metal oxide, a metal hydroxide, a metal nitride, a metal sulfide, a metal carbide, and a metal complex.

The content of the metal in the raw material subjected to carbonization is not particularly limited as long as the carbon catalyst can exhibit desired catalytic activity. The content of the metal is preferably 1 to 90 parts by mass and more preferably 2 to 80 parts by mass relative to 100 parts by mass of the organic substance.

The raw material may further contain other organic substances, other metals, and other components to the extent that the catalytic activity of the carbon catalyst is not impaired. Examples include: a curing agent and a crosslinking agent for the organic substance; a catalyst for the curing reaction or crosslinking reaction; and an electrically conductive carbon material such as carbon black or graphite powder.

The raw material is carbonized by heating to or above the temperature at which the carbonization can be accomplished. The heating temperature for carbonization may be set as appropriate depending on, for example, the type and composition of the raw material used and can be, for example, 300 to 3000° C. The raw material is preferably heated to the temperature within 700 to 2000° C. The carbonization is preferably performed in an atmosphere of inert gas such as nitrogen.

The rate of temperature increase to the carbonization temperature and the duration during which the material is held at the carbonization temperature are not particularly limited as long as the carbonization can proceed sufficiently. For example, the rate of temperature increase can be 0.5 to 300° C./min, and the duration can be 5 minutes to 24 hours.

Depending on, for example, the mode in which the carbon catalyst is to be used, the carbonaceous particles obtained by carbonization of the raw material may be subjected to a further heat treatment or a process such as washing or crashing to further improve the catalytic activity.

The washing is a process for decreasing the metal content in the carbon catalyst and, for example, washing with an acid is preferred. The acid used in the washing is not particularly limited as long as the effect of decreasing the metal content can be achieved. Examples of the acid include concentrated hydrochloric acid, concentrated nitric acid, and concentrated sulfuric acid. The method for the washing is not particularly limited. For example, the washing can be accomplished by the method of keeping the carbon catalyst immersed in an acid-containing solution.

To obtain the same effect, the washing may be replaced by electrolysis.

The washing is preferably followed by a heat treatment in which the carbon catalyst is held at a predetermined temperature. The heat treatment temperature is preferably 300 to 3000° C. and more preferably 700 to 2000° C. The rate of temperature increase to the heat treatment temperature can be, for example, 0.5 to 300° C./min. The duration during which the carbon catalyst is held at the heat treatment temperature can be, for example, 5 minutes to 24 hours. This heat treatment is preferably performed in an atmosphere of inert gas such as nitrogen gas.

The crushing can be accomplished by a commonly known crushing means such as a ball mill or bead mill, depending on the desired particle size of the carbonaceous particles.

The carbonaceous particles obtained as above may further be surface-treated with an aqueous sulfuric acid solution at a concentration within 0.01 to 13 mol/L at a temperature within 35 to 90° C. In this surface treatment, the carbonaceous particles are immersed in the aqueous sulfuric acid solution.

Such a surface treatment using sulfuric acid can improve the durability and charge-discharge characteristics. Furthermore, this surface treatment can serve to further remove the metal component that remains in the carbonaceous particles without being sufficiently removed even by the washing described above.

The use of nitric acid instead of sulfuric acid leads to a decrease in durability and is therefore not preferred.

In the surface treatment, the treatment temperature is more preferably 45 to 80° C. and the concentration of the aqueous sulfuric acid solution is more preferably 1 to 4 mol/L, from the viewpoint of improvement in catalytic activity of the carbon catalyst.

The surface treatment time may be set as appropriate depending on the treatment temperature and the concentration of the aqueous sulfuric acid solution. From the viewpoint of securing sufficient time to obtain a satisfactory effect on improvement in catalytic activity of the carbon catalyst, the surface treatment time is preferably 1 to 28 days.

The carbonaceous particles produced by the carbonization method as described above can be suitably applied to the carbon catalyst of the present invention.

[Electrode]

An electrode for redox flow batteries according to the present invention comprises the above carbon catalyst of the present invention.

The use of the carbon catalyst allows to form an electrode in which the electrode reaction is facilitated and which exhibits good charge-discharge cycle characteristics. Additionally, the improvement in electrode characteristics permits the electrode to be thinner than conventional electrodes.

The electrode material to which the carbon catalyst of the present invention is applied is not particularly limited and may be a commonly known electrode for redox flow batteries. Typically, a carbon electrode is used. Among carbon electrodes, glassy carbon, carbon felt, and carbon fiber non-woven fabric are suitably used, since an electrode having a large surface area and many electrode reaction fields is preferred.

The method for producing an electrode comprising the carbon catalyst is not particularly limited. It is preferable to fix the carbon catalyst to the surface of the electrode material with a binder. Examples of methods that can be used include: a method in which a liquid containing the carbon catalyst and the binder is applied to the surface of the electrode material with a coater or spray; a method in which the electrode material is immersed in a liquid containing the carbon catalyst and the binder and then dried to fix the binder to the surface of the electrode material. With these methods, the carbon catalyst can be fixed uniformly over the entire surface of the electrode material.

The amount of the carbon catalyst fixed to the surface of the electrode material is not particularly limited as long as the amount is sufficient to obtain a satisfactory catalytic activity. The amount may be set as appropriate depending on, for example, the form of the electrode.

[Redox Flow Battery]

A redox flow battery of the present invention comprises the above electrode. The electrode may be used either as the cathode of the redox flow battery or as the anode of the redox flow battery.

The use of the electrode comprising the carbon catalyst of the present invention allows obtaining a redox flow battery in which the electrode reaction is facilitated and which has a reduced cell resistance. Additionally, the improvement in charge-discharge characteristics can be achieved without the use of an expensive catalyst based on a noble metal such as platinum, and a redox flow battery having higher practical use can be provided at a low cost.

The carbon catalyst of the present invention is, in particular, suitably applicable to vanadium redox flow batteries.

EXAMPLES

Hereinafter, the present invention will be described in more detail by Examples. The present invention is not limited by these Examples.

[Production of Carbonaceous Particles]

Production Example 1

A four necked flask was charged with 30.93 g of acrylonitrile (available from Wako Pure Chemical Industries, Ltd.), 4.07 g of methacrylic acid (available from Wako Pure Chemical Industries, Ltd.), and 300 mL of pure water, and the contents of the flask were bubbled with nitrogen gas for 15 minutes. This flask was heated in an oil bath at 70° C., and a solution of 100 mg of potassium peroxodisulfate (available from Wako Pure Chemical Industries, Ltd.) dissolved in 50 ml of pure water was added into the flask, the contents of which were stirred in a nitrogen gas atmosphere to allow polymerization to proceed for 4 hours. After leaving to cool, the resulting milky white solution was concentrated, and the concentrate was vacuum-dried at 60° C. to obtain about 20 g of polyacrylonitrile-polymethacrylic acid copolymer (PAN-PMA).

1.0 g of PAN-PMA obtained above was dissolved in 15 g of N,N-dimethylformamide to prepare a solution A. Additionally, 1.0 g of 2-methylimidazole and 5.78 g of zinc chloride were dissolved in 15 g of N,N-dimethylformamide to prepare a solution B. The solutions A and B were then mixed, and 0.187 g of iron powder was further added and mixed with the solution mixture.

The resulting liquid mixture was vacuum-dried at 60° C. for a whole day. The mixture resulting from the vacuum-drying was heated in air, and the temperature of the mixture was increased from room temperature (25° C.) to 150° C. over 30 minutes and then continuously increased from 150° C. to 220° C. over 2 hours. After that, the mixture was held at 220° C. for 3 hours to infusibilize the mixture and thus prepare a carbonization raw material.

After leaving to cool, the carbonization raw material prepared was crashed with a planetary ball mill (P-7, available from Fritsch Japan Co., Ltd.).

The crashed carbonization raw material was placed in a quartz tube and carbonized by heating the material in an image furnace in a nitrogen gas atmosphere, increasing the temperature of the crashed raw material from room temperature (25° C.) to 1100° C. at a temperature increase rate of 50° C./min and holding the material at 1100° C. for 1 hour.

After leaving to cool, the resulting carbonized product was crashed with the same planetary ball mill as used above and with a bead mill (RMB-type batch bead mill, available from AIMEX Co., Ltd.).

20 mL of concentrated hydrochloric acid was added to 1.0 g of the crashed carbonized product, the mixture was stirred for 30 minutes to precipitate the carbonized product, and the supernatant was removed. In this way, the carbonized product was acid-washed. This was followed by washing with a 1:1 mixed solution of concentrated hydrochloric acid and distilled water, filtration, further washing with distilled water, and filtration. After the filtrate was confirmed to be neutral with pH paper, the filtration residue was vacuum-dried.

The carbonized product obtained as above was placed in a quartz tube and heat-treated by heating the product with an image furnace in a nitrogen gas atmosphere, increasing the temperature of the product from room temperature (25° C.) to 700° C. at a temperature increase rate of 50° C./min and holding the product at 700° C. for 1 hour.

After leaving to cool, the carbonized product was obtained in the form of carbonaceous particles.

Production Example 2

Beads made of phenolic resin (particle size: 6 μm, available from Gunei Chemical Industry Co., Ltd.) were carbonized by heating the beads in vacuum from room temperature (25° C.) to 1000° C. at a temperature increase rate of 0.8° C./min and holding the beads at 1000° C. for 1 hour. This was followed by leaving to cool, and thus carbonaceous particles were obtained.

[Carbon Catalyst]

Example 1

The carbonaceous particles produced in Production Example 1 were used as a carbon catalyst.

Example 2

Ketjenblack (EC600JD, available from Lion Specialty Chemicals Co., Ltd.) was used as a carbon catalyst.

Comparative Example 1

Vapor-grown carbon fiber (VGCF (registered trademark), available from SHOWA DENKO K.K.) was used as a carbon catalyst.

Comparative Example 2

Activated carbon (MAXSORB (registered trademark) available from Kansai Coke and Chemicals Company, Limited) was used as a carbon catalyst.

Comparative Example 3

The carbonaceous particles produced in Production Example 2 above were used as a carbon catalyst.

[Measurements and Evaluations]

The carbon catalysts of Examples and Comparative Examples above were subjected to the following measurements and evaluations.

(Specific Surface Area)

The specific surface area of the sample was calculated by a BET method using an adsorption isotherm obtained by nitrogen gas adsorption measurement. The sample used in the nitrogen gas adsorption measurement was prepared by holding 0.05 g of the carbon catalyst at 100° C. and 1 Pa or less for 3 hours to remove the adsorbed water. The measurement conditions were an equilibrium relative pressure ($P/P_0$) of nitrogen gas of 0 to 0.99 MPa and a temperature of −196° C. (77 K).

(Average Particle Size)

The particle size distribution measurement was conducted by a laser diffraction-scattering method, and the D50 was determined as the average particle size. The measurement apparatus used was a laser-diffraction particle size distribution analyzer (SALD-7100H, available from Shimadzu Corporation). The measurement sample used was a sample liquid prepared by placing about 0.1 g of the carbon catalyst and 40 g of distilled water in a sample vessel and thoroughly stirring the contents of the vessel with ultrasonic waves. This sample liquid was injected into a stirring water bath so that the scattered light intensity would be 50 to 70%, and then the particle size distribution measurement was conducted.

(Aspect Ratio)

In Example 1 and Comparative Examples 2 and 3, the carbon catalyst was observed with a scanning electron microscope (JSM-6701F, available from JEOL Ltd., accelerating voltage: 5 kV), while in Example 2 and Comparative Example 1, the carbon catalyst was observed with a transmission electron microscope (JEM-200CX, available from JEOL Ltd., accelerating voltage: 200 kV). Each observed image was analyzed to determine the aspect ratio. Ten particles were randomly selected in the observed image and, for each particle, the ratio of long side to short side of the smallest rectangle among circumscribed rectangles of the particle shape was determined. The average of the values determined for the 10 particles was defined as the aspect ratio.

(N/C Ratio and O/C Ratio)

The N/C ratio and O/C ratio in the surface of the carbon catalyst were determined by XPS surface analysis. The XPS surface analysis was conducted with an X-ray photoelectron spectrometer (AXIS NOVA, available from Kratos Analytical Ltd.) using AlKα ray (10 mA, 15 kV) as the X-ray source. For core-level photoelectron spectra of the various atoms in the surface of the carbonaceous particles, the binding energy was corrected by assuming the peak of the C1s spectrum to be at 284.5 eV. The N/C ratio and O/C ratio in the surface of the carbonaceous particles were calculated from the peak area of each spectrum and the detection sensitivity factor. The lower quantification limit was 0.0001.

(Quantification of Metal Component)

Quantification of the metal component was conducted by ICP emission spectrometry. The measurement apparatus used was an ICP emission spectrometer (ICPS-8100, available from Shimadzu Corporation). The measurement sample used was a sample solution prepared by weighing about 50 mg of the carbon catalyst, completely incinerating the catalyst with a muffle furnace except for the metal component, adding 5 ml of concentrated hydrochloric acid to the resulting product, causing thermal decomposition at 100° C., and then adding 45 ml of distilled water for volume adjustment. The lower quantification limit was 0.001 mass %.

(Durability)

The durability was evaluated by an acid-resistance test, in which 500 mg of the carbon catalyst was added to 20 mL of a 4 mol/L aqueous sulfuric acid solution and the mixture was stirred at 45° C. for 3 hours.

The suspension obtained after the test was filtered to collect the carbon catalyst, and the carbon catalyst was subjected to repeated cycles of washing with distilled water and filtration. After the filtrate was confirmed to be neutral with pH paper, the carbon catalyst was dried with a reduced-pressure dryer (5000 Pa) at 60° C. overnight. Subsequently, the dried carbon catalyst was collected, and its mass was measured. A rating of "A" was given when the change ratio in mass from the mass of the carbon catalyst before test was 5% or less, while a rating of "B" was given when the change in mass was more than 5%.

(Oxidation-Reduction Potential Measurement)

First, the carbon catalysts prepared in Examples and Comparative Examples above were used to prepare electrode samples by the method described below. Each of the prepared electrode samples was subjected to oxidation-reduction potential measurement by cyclic voltammetry under the conditions listed below, and thus the oxidation-reduction potential difference, oxidation current density, and reduction current density were determined.

<Preparation of Electrode Sample>

500 μL of a water-isopropyl alcohol mixture (at a mass ratio of 8:2) and 50 μL of a 5 mass % aqueous solution of Nafion (registered trademark) were added to 5.0 mg of the carbon catalyst, and the catalyst was ultrasonically dispersed with an ultrasonication bath for 10 minutes. The dispersion was then stirred and mixed with a homogenizer (Sonifier (registered trademark) MODEL S-150D, available from BRANSON) for 2 minutes to prepare a catalyst slurry.

A drop of 1.382 μL of this catalyst slurry was placed on a glassy carbon rotating disk electrode (diameter: 4 mm, length: 2.6 cm) using a microsyringe, and the slurry was spread over the entire surface of the electrode with the tip of the microsyringe. The slurry was then dried with hot air from a dryer to fix the carbon catalyst to the surface of the electrode at a density of 0.1 mg/cm$^2$.

A drop of a 0.5 mol/L aqueous sulfuric acid solution was placed on this electrode with the fixed carbon catalyst, and degassing was performed to replace the air in the electrode with the 0.5 mol/L aqueous sulfuric acid solution. In this way, the electrode sample was prepared.

<Measurement Conditions of Cyclic Voltammetry>

Working electrode: Rotating electrode employing the electrode sample prepared as above Counter electrode: Platinum electrode Reference electrode: Reversible hydrogen electrode (0.5 mol/L aqueous sulfuric acid solution)

Electrolyte solution: Aqueous vanadium-sulfuric acid solution (60 mL) containing 0.1 mol/L of vanadium ions ($V^{4+}$) and 2 mol/L of sulfate ions ($SO_4^{2-}$)

Temperature: Room temperature (25° C.)

Atmosphere: Degassed with nitrogen gas at 0.35 L/min for 10 minutes and then flowed.

Sweep potential: 1.5 to 0.3 V (versus reference electrode)

Sweep speed: 0.05 V/s

Sweep cycles: 5 cycles

A smaller oxidation-reduction potential difference as determined by the above cyclic voltammetry indicates that the reversibility of the oxidation-reduction reaction is higher. Larger absolute values of the oxidation current density and reduction current density indicate that the catalytic activity is higher.

The results of the measurements and evaluations described above are collectively shown in Table 1 below.

In Comparative Example 2, the oxidation-reduction potential measurement was difficult to continue because the carbon catalyst was dissolved out during the measurement.

In Comparative Example 3, the carbon catalyst was difficult to fix to the surface of the electrode due to the too-large particle size, and thus preparation of an electrode sample ended in failure.

TABLE 1

|  | Example 1 | Example 2 | Comparative Example 1 | Comparative Example 2 | Comparative Example 3 |
|---|---|---|---|---|---|
| Carbon catalyst | Production Example 1 | Ketjenblack | Vapor-grown carbon fiber | Activated carbon | Production Example 2 |
| Specific surface area (m$^2$/g) | 1404 | 1242 | 13 | 2400 | 36 |
| Average particle size (nm) | 790 | 220 | 150 | 1000 | 4530 |
| Aspect ratio | 1.5 | 2.0 | 53 | 2.0 | 1.0 |
| N/C ratio | 0.017 | — | — | 0 | — |
| O/C ratio | 0.064 | 0.039 | 0.052 | 0.042 | 0.031 |
| Metal component (mass %) | 0.602 | 0.002 | 0.001 | 0.002 | — |
| Durability | A | A | A | B | A |
| Oxidation-reduction potential difference (mV) | 150 | 175 | 807 |  |  |
| Oxidation current density (mA/cm$^2$) | 7.729 | 8.615 | 6.928 |  |  |
| Reduction current density (mA/cm$^2$) | −6.200 | −5.772 | −1.163 |  |  |

The symbol "-" used in the rows for the N/C ratio and metal component in Table 1 means that the value was less than the lower quantification limit.

As seen from the results shown in Table 1, the carbon catalysts (Examples 1 and 2) consisting of carbonaceous particles having an average particle size of 100 to 1000 nm and a specific surface area of 800 to 2000 m$^2$/g yielded a small oxidation-reduction potential difference and can be determined to provide a high reversibility of oxidation-reduction reaction. Additionally, the carbon catalysts yielded large absolute values of the oxidation current density and reduction current density and can be determined to have high catalytic activity.

REFERENCE SIGNS LIST

1 Cell
1a Cathode cell
1b Anode cell
2 Catholyte tank
3 Anolyte tank
4 Separation membrane 5 Cathode
6 Anode
7 Catholyte pump
8 Anolyte pump.

The invention claimed is:

1. A carbon catalyst for redox flow battery electrodes, being a particulate carbon catalyst and consisting of carbonaceous particles having a specific surface area of 800 to 2000 m²/g and an average particle size of 100 to 1000 nm, wherein the carbonaceous particles comprise 0.001 to 1.0 mass % of a metal component.

2. The carbon catalyst according to claim 1, wherein the carbonaceous particles have an aspect ratio of 1 to 10.

3. The carbon catalyst according to claim 1, wherein the carbonaceous particles comprise carbon, nitrogen, and oxygen.

4. An electrode for redox flow batteries, comprising the carbon catalyst according to claim 1.

5. A redox flow battery comprising the electrode according to claim 4.

6. The redox flow battery according to claim 5, being a vanadium redox flow battery.

* * * * *